United States Patent
Schmidt, Jr.

(10) Patent No.: US 10,644,814 B2
(45) Date of Patent: *May 5, 2020

(54) INTERMODULATION BYPRODUCT CANCELLATION IN ONE OR MORE NODES OF A DISTRIBUTED ANTENNA SYSTEM

(71) Applicant: CommScope Technologies LLC, Hickory, NC (US)

(72) Inventor: Nelson Christian Schmidt, Jr., Lexington, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,437

(22) Filed: Jul. 8, 2019

(65) Prior Publication Data

US 2019/0334639 A1    Oct. 31, 2019

Related U.S. Application Data

(63) Continuation of application No. 15/555,373, filed as application No. PCT/US2016/020570 on Mar. 3, 2016, now Pat. No. 10,348,424.

(Continued)

(51) Int. Cl.
*H04B 17/24* (2015.01)
*H04B 17/00* (2015.01)
(Continued)

(52) U.S. Cl.
CPC .............. *H04B 17/24* (2015.01); *H04B 1/10* (2013.01); *H04B 7/04* (2013.01); *H04B 17/0085* (2013.01);
(Continued)

(58) Field of Classification Search
CPC ........ H04B 1/0475; H04B 1/109; H04B 1/10; H04B 15/00; H04B 17/0085; H04B 17/12; H04B 17/24; H04B 7/04
See application file for complete search history.

(56) References Cited

U.S. PATENT DOCUMENTS 6,801,767 B1    10/2004    Schwartz et al.
8,867,451 B2    10/2014    Kummetz et al.
(Continued)

FOREIGN PATENT DOCUMENTS

| EP | 2713522 A1 | 4/2014 |
|---|---|---|
| KR | 20140111136 A | 9/2014 |
| WO | 2014040608 A1 | 3/2014 |

OTHER PUBLICATIONS

European Patent Office, "Extended European Search Report from EP Application No. 16759453.0 dated Sep. 20, 2018", from Foreign Counterpart to U.S. Appl. No. 15/555,373, pp. 1-9, Published: EP.
(Continued)

*Primary Examiner* — Devan A Sandiford
(74) *Attorney, Agent, or Firm* — Fogg & Powers LLC

(57) ABSTRACT

One embodiment is directed to a device comprising one or more processing devices comprising an input and an output. The one or more processing devices are configured to receive an input signal via the input of the one or more processing devices. The one or more processing devices are further configured to apply a transfer function of a variable filter implemented via the one or more processing devices, the transfer function applied to the received input signal in order to generate a filtered signal, wherein application of the transfer function cancels, reduces, attenuates, or eliminates intermodulation byproducts of the input signal. The one or more processing devices are further configured to output the filtered signal via the output of the one or more processing devices.

20 Claims, 8 Drawing Sheets

Related U.S. Application Data

(60) Provisional application No. 62/128,189, filed on Mar. 4, 2015.

(51) Int. Cl.
  *H04B 17/12* (2015.01)
  *H04B 1/10* (2006.01)
  *H04B 17/14* (2015.01)
  *H04B 7/04* (2017.01)
  *H04W 88/08* (2009.01)

(52) U.S. Cl.
  CPC ............. *H04B 17/12* (2015.01); *H04B 17/14* (2015.01); *H04W 88/085* (2013.01)

(56) References Cited

U.S. PATENT DOCUMENTS

| | | |
|---|---|---|
| 9,490,890 B2 | 11/2016 | Cho |
| 9,602,211 B2 | 3/2017 | Yeo et al. |
| 9,742,547 B2 | 8/2017 | Galeev et al. |
| 9,894,623 B2 | 2/2018 | Dussmann et al. |
| 10,348,424 B2 | 7/2019 | Schmidt, Jr. |
| 2001/0033196 A1* | 10/2001 | Lennous ............... H03H 11/24 327/552 |
| 2004/0157645 A1 | 8/2004 | Smith et al. |
| 2004/0248544 A1 | 12/2004 | Lamothe |
| 2005/0162219 A1 | 7/2005 | Adan |
| 2005/0176368 A1 | 8/2005 | Young et al. |
| 2006/0273868 A1 | 12/2006 | Ebner |
| 2007/0001754 A1 | 1/2007 | Lakdawala et al. |
| 2007/0285156 A1 | 12/2007 | Roberts et al. |
| 2008/0106333 A1 | 5/2008 | Liu |
| 2009/0121788 A1 | 5/2009 | Deisch |
| 2010/0167717 A1 | 7/2010 | Hafeez et al. |
| 2012/0028587 A1 | 2/2012 | Ferguson et al. |
| 2012/0076217 A1 | 3/2012 | Kirshenbaum et al. |
| 2012/0108188 A1 | 5/2012 | Matsumoto et al. |
| 2012/0309328 A1 | 12/2012 | Morrison et al. |
| 2012/0329523 A1 | 12/2012 | Stewart et al. |
| 2013/0071112 A1 | 3/2013 | Melester et al. |
| 2013/0135907 A1 | 5/2013 | Oi et al. |
| 2013/0272250 A1 | 10/2013 | Shimezawa et al. |
| 2013/0310090 A1 | 11/2013 | Bevan et al. |
| 2013/0330710 A1 | 12/2013 | Omenetto et al. |
| 2013/0336370 A1 | 12/2013 | Jovanovic et al. |
| 2014/0003561 A1 | 1/2014 | Ranson et al. |
| 2014/0050253 A1 | 2/2014 | Jovanovic |
| 2014/0119197 A1 | 5/2014 | Maca et al. |
| 2014/0161159 A1* | 6/2014 | Black ............... H04B 15/00 375/219 |
| 2014/0233666 A1 | 8/2014 | Campos et al. |
| 2014/0269318 A1 | 9/2014 | Hasarchi et al. |
| 2014/0293894 A1 | 10/2014 | Saban et al. |
| 2014/0370884 A1 | 12/2014 | Kummetz et al. |
| 2015/0032788 A1* | 1/2015 | Velazquez ............ H04L 27/265 708/819 |
| 2015/0097579 A1 | 4/2015 | Sharma et al. |
| 2015/0098350 A1 | 4/2015 | Mini et al. |
| 2015/0249965 A1 | 9/2015 | Dussmann et al. |
| 2015/0264582 A1 | 9/2015 | Brighenti et al. |
| 2015/0296527 A1 | 10/2015 | Ranson et al. |
| 2015/0303958 A1 | 10/2015 | Davydov et al. |
| 2015/0350940 A1 | 12/2015 | Wilson et al. |
| 2015/0358133 A1 | 12/2015 | Kusashima et al. |
| 2015/0373722 A1 | 12/2015 | Lange |
| 2016/0006468 A1 | 1/2016 | Gale et al. |
| 2016/0142229 A1 | 5/2016 | Bevan et al. |
| 2016/0249365 A1 | 8/2016 | Harel |
| 2016/0345282 A1 | 11/2016 | Maca et al. |
| 2016/0380668 A1 | 12/2016 | Aoki et al. |
| 2017/0026104 A1 | 1/2017 | Lange |
| 2017/0070975 A1 | 3/2017 | Ranson et al. |
| 2017/0222858 A1 | 8/2017 | Wilson et al. |
| 2017/0250765 A1 | 8/2017 | Hasarchi et al. |
| 2018/0048402 A1 | 2/2018 | Schmidt, Jr. |
| 2018/0081047 A1 | 3/2018 | Gander |
| 2018/0124635 A1 | 5/2018 | Ranson et al. |
| 2018/0138938 A1 | 5/2018 | Morrison et al. |
| 2018/0160380 A1 | 6/2018 | Dussmann et al. |
| 2018/0191397 A1 | 7/2018 | Morrison |
| 2018/0212692 A1 | 7/2018 | Kummetz et al. |
| 2018/0212693 A1 | 7/2018 | Harel |

OTHER PUBLICATIONS

International Searching Authority, "International Search Report and Written Opinion from PCT Application No. PCT/US2016/020570 dated Jun. 29, 2016", from Foreign Counterpart to U.S. Appl. No. 15/555,373, pp. 1-11, Published: WO.

U.S. Patent and Trademark Office, "Notice of Allowance", U.S. Appl. No. 15/555,373, dated Feb. 27, 2019, pp. 1-9, Published: US.

U.S. Patent and Trademark Office, "Office Action", U.S. Appl. No. 15/555,373, dated Oct. 1, 2018, pp. 1-46, Published: US.

* cited by examiner

INTERMODULATION BYPRODUCT CANCELLATION IN ONE OR MORE NODES OF A DISTRIBUTED ANTENNA SYSTEM

CROSS-REFERENCE TO RELATED APPLICATIONS

This application is a continuation of U.S. application Ser. No. 15/555,373, titled "INTERMODULATION BYPRODUCT CANCELLATION IN ONE OR MORE NODES OF A DISTRIBUTED ANTENNA SYSTEM," filed on Sep. 1, 2017, which is a U.S. National Stage application of PCT Application Serial No. PCT/US2016/020570, titled "INTERMODULATION BYPRODUCT CANCELLATION IN ONE OR MORE NODES OF A DISTRIBUTED ANTENNA SYSTEM," filed on Mar. 3, 2016, which claims priority to, and benefit of, U.S. Provisional Application No. 62/128,189, titled "INTERMODULATION BYPRODUCT CANCELLATION AT A HEAD-END UNIT OF A DISTRIBUTED ANTENNA SYSTEM," filed on Mar. 4, 2015, the contents of all of which are hereby incorporated by reference in their entirety.

BACKGROUND

This disclosure relates to certain aspects and features of systems and methods for reducing self-defense in the receive bands of a telecommunications system. One example of a telecommunications system is a distributed antenna system (DAS). A DAS can be used to extend wireless coverage in an area through the use of one or more repeaters and multiple remote units coupled to each repeater. Head-end units can be coupled to one or more base stations that can each manage wireless communications for different cell sites. A head-end unit can receive downlink signals from the base station and distribute downlink signals in analog or digital form to one or more remote units. The remote units can transmit the downlink signals to user equipment devices within coverage areas serviced by the remote units. In the uplink direction, signals from user equipment devices may be received by the remote units. The remote units can transmit the uplink signals received from user equipment devices to the head-end unit. The head-end unit can transmit uplink signals to the serving base stations.

SUMMARY

One embodiment is directed to a distributed antenna system (DAS) comprising a plurality of nodes, including a head-end unit and a plurality of remote units that are communicatively coupled to the head-end unit. The head-end unit is configured to receive uplink received signals from remote units that wirelessly transceiver signals in a coverage area. The head-end unit is configured to sum two or more of the uplink received signals to produce a summed uplink received signal. At least one of the nodes of the DAS includes a processing device configured to determine a transfer function and apply the transfer function to signals in the DAS to cancel, reduce, attenuate, or eliminate intermodulation byproducts in the summed uplink received signal.

Another embodiment is directed to a method performed in a distributed antenna system (DAS) comprising a plurality of nodes, include a head-end unit communicatively coupled to a plurality of remote units. The method comprises transmitting a test reference signal from the remote unit, receiving a feedback signal from the test reference signal at a receive antenna of the remote unit, and calculating, from the test reference signal and the feedback signal, a transfer function to cancel, reduce, attenuate, or eliminate intermodulation byproducts in subsequent signals received by the head-end unit. The method further comprises applying the transfer function to signals of the DAS in order to cancel, reduce, attenuate, or eliminate intermodulation byproducts.

DRAWINGS

DETAILED DESCRIPTION

Figure 1:
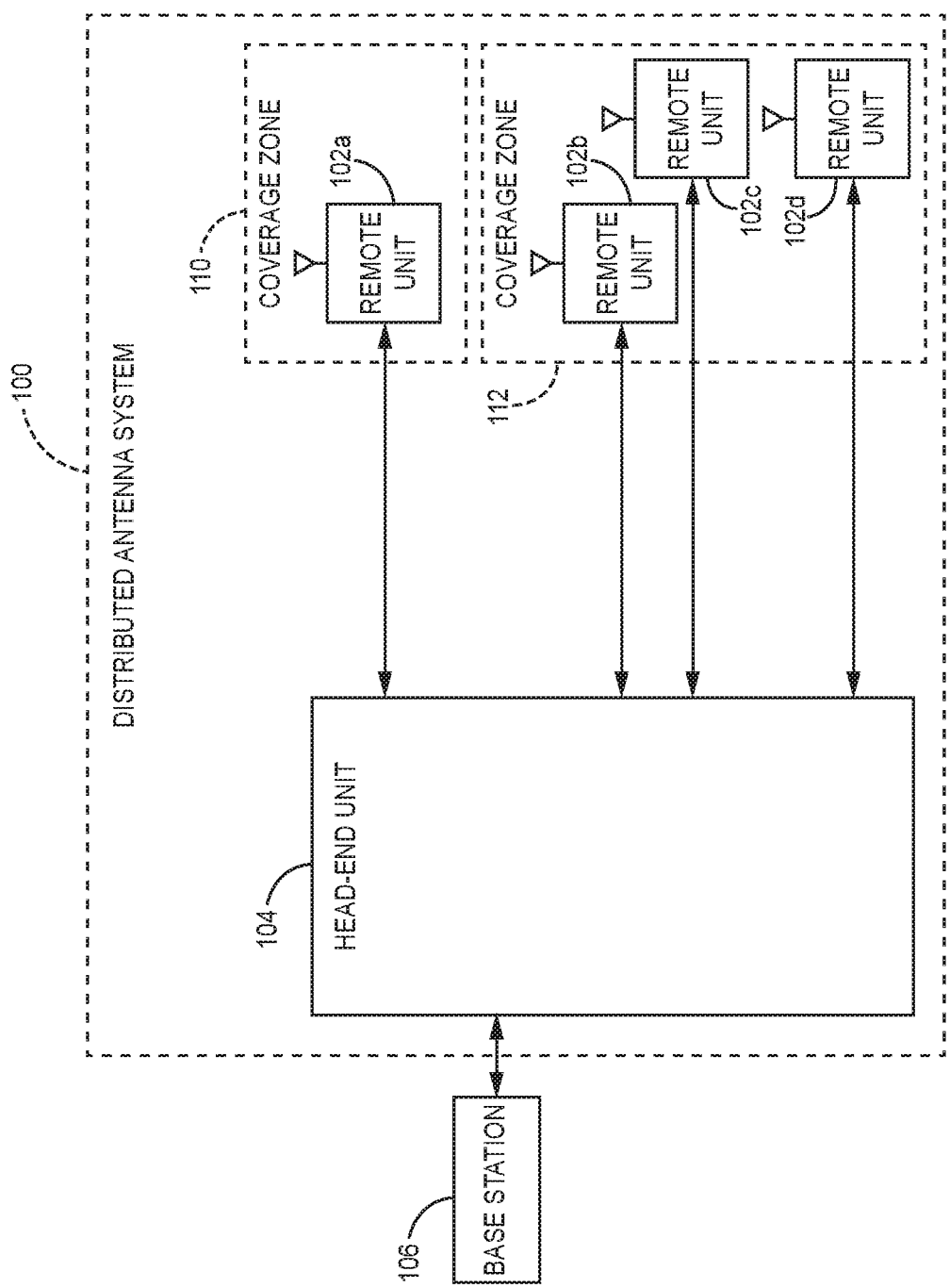
FIG. 1 is a block diagram of one exemplary embodiment of a distributed antenna system.

FIG. 1 depicts an example of a DAS 100 according to aspects and features of the subject matter described herein. The DAS 100 can include a network of various nodes including spatially separated remote units 102a-d communicatively coupled to a head-end unit 104 for communicating with one or more base stations 106 according to one aspect. For example, remote units 102a-d can connect directly to the head-end unit 104. In other aspects, the head-end unit 104 can be coupled to remote units 102a-d via a transport expansion unit or another intermediate device. The remote units 102a-d can provide wireless service to user equipment devices positioned in respective geographic coverage zones 110, 112.

The head-end unit 104 can receive downlink signals from the base station 106 and transmit uplink signals to the base station 106. Any suitable communication link can be used for communication between base stations and head-end units, such as (but not limited to) a direct connection or a wireless connection. A direct connection can include, for example, a connection via a copper, optical fiber, or other suitable communication medium. In some aspects, the head-end unit 104 can include an external repeater or internal RF transceiver to communicate with the base station 106. In some aspects, the head-end unit 104 can combine downlink signals received from different base stations. The head-end unit 104 can transmit the combined downlink signals to one or more of the remote units 102a-d.

Remote unit 102a can provide signal coverage in a coverage zone 110 by transmitting downlink signals to mobile communication devices in the coverage zone 110 and receiving uplink signals from the user equipment in the coverage zone 110. In another aspect, multiple remote units 102b-d can provide signal coverage in a single coverage zone 112. The remote units 102a-d can transmit uplink signals to the head-end unit 104. The head-end unit 104 can include a summer device to combine uplink signals received from remote units 102a-d for transmission to the base station 106

A downlink signal transmitted by the base station can be repeated by the head-end unit such that copies of the downlink signal are provided to the remote units connected to the DAS. The remote units can then provide the copies of the common downlink signal to user devices in respective coverage zones.

The DAS 100 (and the nodes thereof including the head-end unit 104 and the remote units 102a-d) can be configured to distribute wireless signals that are communicated using a wireless air interface that supports one or more of frequency-division duplexing (FDD) and/or time-division duplexing (TDD). Also, the DAS 100 can be configured to distribute wireless signals that are communicated using a wireless air interface that supports one or more of the multiple-input-multiple-output (MIMO), single-input-single-output (SISO), single-input-multiple-output (SIMO), and/or multiple-input-single-output (MISO) schemes. Moreover, the DAS 100 can be configured to support multiple wireless air interfaces and/or to support multiple wireless operators.

The DAS 100 can use either digital transport, analog transport, or combinations of digital and analog transport for communicating between the head-end unit 104 and the remote units 102a-d. The examples shown in FIGS. 2-8 are described below, for the purposes of illustration, as being implemented using digital transport. However, it is to be understood that such examples can also be implemented in DASs that use analog transport or combinations of analog and digital transport.

In embodiments where the DAS 100 uses digital transport for communicating between the head-end unit 104 and the remote units 102a-d, digital samples indicative of the original wireless signals are communicated between the head-end unit 104 and the remote units 102a-d. In such embodiments, the digital samples can be in the form of digital in-phase (I) and quadrature (Q) samples (though it is to be understood that other embodiments can use other forms of digital samples). Digital IQ samples can be produced from an analog wireless signal received at radio frequency (RF) by down-converting the received signal to an intermediate frequency (IF) or to baseband, digitizing the down-converted signal to produce real digital samples, and digitally down-converting the real digital samples to produce digital in-phase and quadrature samples. These digital IQ samples can also be filtered, amplified, attenuated, and/or re-sampled or decimated to a lower sample rate. The digital samples can be produced in other ways. The portion of wireless spectrum can include, for example, a band of wireless spectrum, a sub-band of a given band of wireless spectrum, or an individual wireless carrier. Likewise, an analog wireless signal can be produced from digital IQ samples by digitally up-converting the digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate. The analog signal can be produced in other ways (for example, where the digital IQ samples are provided to a quadrature digital-to-analog converter that directly produces the analog IF or baseband signal).

In embodiments where digital IQ samples are used for digital transport, the head-end unit 104 can be configured to generate one or more downlink streams of digital IQ samples from one or more signals or inputs that are provided to the head-end unit 104 from the one or more base stations 106. In such embodiments, each remote unit 102a-d receives one or more downlink streams of digital IQ samples produced by the head-end unit 104 and generates one or more analog downlink radio frequency wireless signals that are radiated from one or more antennas that are associated with the remote unit 102a-d. Typically, each downlink stream of digital IQ samples is provided to a group of one or more remote units 102a-d in order to simulcast the generated analog downlink radio frequency wireless signals from multiple locations.

In embodiments where digital IQ samples are used for digital transport, each remote unit 102a-d is configured to generate one or more uplink streams of digital IQ samples from one or more analog uplink radio frequency wireless signals received by one or more antennas associated with the remote unit 102a-d. For each downlink stream of digital IQ samples that is provided from the head-end unit 104 to a respective group of one or more remote units 102a-d, the head-end unit 104 produces a corresponding uplink stream of digital IQ samples. Each such uplink stream is typically produced by combining individual uplink streams of digital IQ samples from each of the one or more multiple remote units 102a-d (for example, by digitally summing corresponding IQ samples from each uplink stream). The head-end unit 104 then uses each such combined uplink stream of digital IQ samples to generate a signal or other output that is provided from the head-end unit 104 to a base station 106.

In the examples shown in FIGS. 2-8, for the purposes of illustration, the same downlink signals are simulcast from all of the remote units and, accordingly, the corresponding uplink signals from all of the remote units are combined together by one or more summers. However, it is to be understood that other embodiments can be implemented in other ways (for example, different downlink signals can be provided to different groups of remote units, in which case the corresponding uplink signals received from each of the different groups of remote units would be separately combined together).

The analog downlink signals transmitted by the remote units can create intermodulation byproducts that, in a DAS with no duplexer or output filter, can feed back into the receive antennas of the remote units. Due to limited transmitter/receiver isolation, the intermodulation byproducts can show up in the receive/uplink path being transmitted to the base station. The feedback intermodulation byproducts can interfere with uplink signals being received by the remote units. In a DAS system where multiple remote units are combined, the receiver band noise and intermodulation byproducts from the transmitter of the remote unit can be summed together with uplink signals from each remote unit. If the receive signals are uncorrelated, each doubling of the number of remote units can add another three decibels of intermodulation byproduct noise to the interference, reducing the overall signal to interference and noise ratio (SINR). If the receive signals are correlated, then a doubling of the number of remote units can add another six decibels to the intermodulation noise. It is desirable to reduce, attenuate, eliminate, or cancel the received intermodulation byproducts in order to increase the SINR of the overall DAS.

To reduce the impact of the intermodulation byproducts on the receive band, certain aspects and features relate to an intermodulation canceler that can cancel, reduce, attenuate, or eliminate the intermodulation byproducts present in uplink signals on the receive path. As the downlink signal transmitted by the base station is repeated and copied by the head-end unit, the undesired intermodulation byproducts are similar. Due to the shouldering characteristics of spread-signal intermodulation, the transmit intermodulation byproducts tend to be clustered at one end of the receive band, such that the intermodulation signals can share the same phase variation across frequency. Anti-correlation can be achieved by using a gain and phase adjustment to each received signal. If the received signals vary significantly in phase and gain across the intermodulation byproducts, aspects and features disclose a frequency-dependent transfer function to manipulate the signal in order to cancel, reduce, attenuate, or eliminate the unwanted noise.

Unwanted intermodulation byproducts in the receive band can be canceled, reduced, attenuated, or eliminated by a processing device in the head-end unit. The head-end unit can receive uplink signals transmitted by remote units, each uplink signal including unwanted intermodulation byproducts. A processing device in the head-end unit can apply a transfer function to the received uplink signals in order to cancel out, reduce, attenuate, or eliminate the unwanted intermodulation byproducts. A transfer function can include the filtering used to modify the amplitude and gain of an input signal so that undesired intermodulation byproducts are canceled, reduced, attenuated, or eliminated from the input signal while desired uplink signals to be provided to the base station are unmodified. Various methods exist for calculating the transfer function to apply to received signals at the head-end unit. Such processing can be performed in other nodes in the DAS.

The examples shown in FIG. 2-8 are initially described below as being implemented in a digital DAS where digital transport is used to communicate digital samples indicative of original wireless signals between the head-end units and remote units (perhaps via one or more expansion units or other intermediary units). The digital samples can be in the form of digital IQ data. In each of the examples shown in FIGS. 2-8, one or more DAS nodes (for example, one or more head-end units, expansion or intermediary units, or remote units) includes one or more processing devices or circuits 122 (collectively referred to here as a "processing device" 122) that digitally processes the digital IQ data that is communicated in the DAS. The processing device 122 can be implemented, for example, using one or more digital devices or circuits that perform digital signal processing (for example, using one or more digital signal processors or other programmable processors and/or using one or more field programmable gate arrays (FPGAs)). Each processing device 122 can be implemented in other ways.

In each of the examples shown in FIGS. 2-8, each processing device 122 implements one or more transfer function filters 124. Each transfer function filter 124 implements a variable filter that can be configured to apply a calculated transfer function to the respective input of the transfer function filter 124, the result of which is the output of that filter 124. Each processing device 122 also implements one or more summers 126. Each summer 126 sums the multiple inputs to that summer 126 (for example, by digitally summing corresponding IQ samples from the various inputs) to produce its output.

Each processing device 122 also implements one or more samplers 128. Each sampler 128 captures samples of its input while passing its input through unchanged as the output of the sampler 128. The captured samples are provided to one or more transfer function calculators 130. Each processing device 202 implements one or more transfer function calculators 130. Each transfer function calculator 130 determines a transfer function based on the various samples it receives. The calculated transfer function can then be provided to one or more transfer function filters 124 in order to configure the variable filter in each such transfer function filter 124 so that it applies the calculated transfer function to the input of that transfer function 124.

The processing device 122 also implements one or more standard DAS processing blocks 132 that perform standard digital DAS processing on the downlink and uplink IQ data (for example, as described above).

Figure 2:
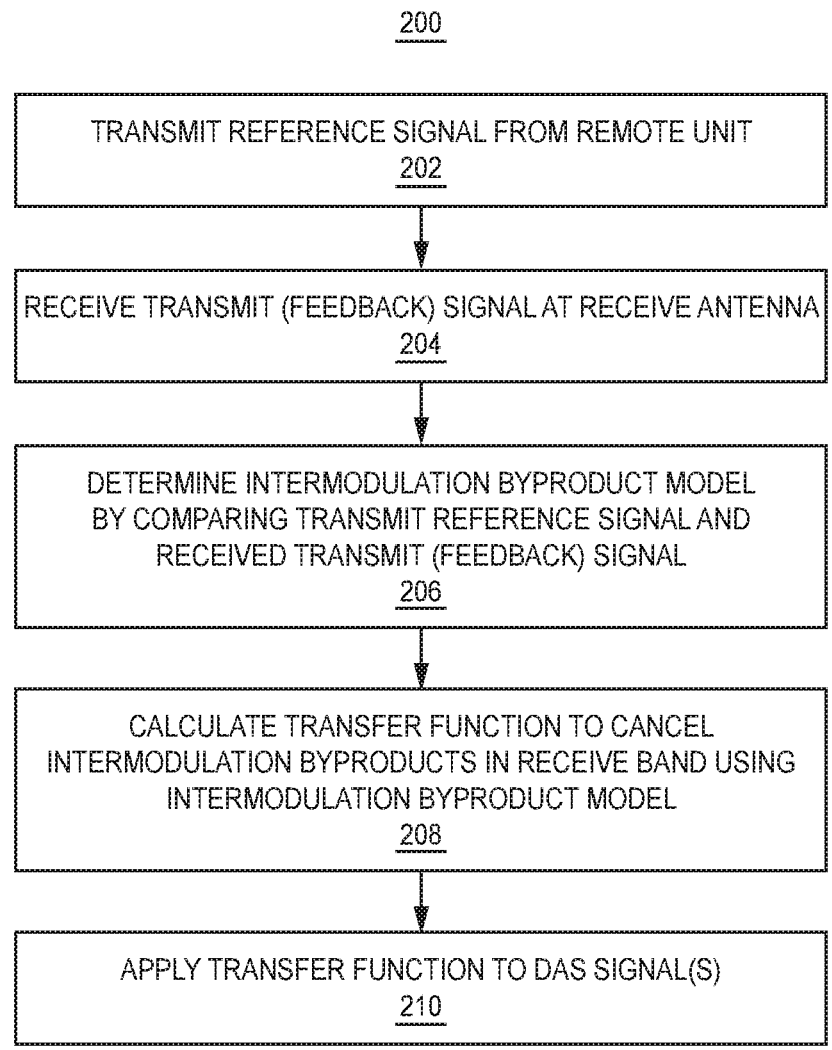
FIG. 2 is a flow diagram of one exemplary embodiment of a method for calculating a transfer function designed to cancel, reduce, attenuate, or eliminate unwanted intermodulation byproducts received at the head-end unit.

FIG. 2 is a flow diagram illustrating one exemplary method 200 for calculating a transfer function designed to cancel, reduce, attenuate, or eliminate unwanted intermodulation byproducts received at the head-end unit. A remote unit can be configured to generate and transmit a test reference signal (block 202). The test reference signal can be transmitted during times of low user activity in the DAS or during a DAS maintenance period so as not to interfere with normal DAS operations. A receive antenna at the remote unit can receive feedback signals from the transmitted test reference signal (block 204), the feedback signals including the unwanted intermodulation byproducts. A processing device 122 in one or more nodes of the DAS can use the received feedback signal to determine an intermodulation byproduct model by comparing signal characteristics of the transmitted test signal and the received feedback signal (block 206). The differences in the signal characteristics between the transmitted test signal and the received feedback signal can correspond to the intermodulation byproduct model (e.g., the amount of amplitude and phase differences present in the receive signals). For example, the feedback signal can be provided to the head-end unit, and a processing device 122 in the head-end unit can use the received feedback signal to determine an intermodulation byproduct model by comparing signal characteristics of the transmitted test signal and the received feedback signal.

The processing device 122 (more specifically, one or more transfer function calculators 130 implemented using the processing device 122) can then generate a transfer function that includes the inverse signal characteristics (e.g., inverse amplitude and phase) of the intermodulation byproduct model (block 208). During subsequent operation of the DAS, a processing device 122 in one or more nodes of the DAS (such as one or more of the head-end units, remote units, or any expansion units or other intermediary nodes) can apply the transfer function to at least one DAS signal in order to cancel, reduce, attenuate, or eliminate the unwanted intermodulation byproducts (block 210). For example, the transfer function can be applied to at least one of the uplink signals communicated from the remote units to the head end unit or at least one of the downlink signals communicated from the head end units to the remote units.

In the case where the transfer function is applied to the uplink signals received at the head end from the remote units, the transfer function is applied to cancel, reduce, attenuate, or eliminate the unwanted intermodulation byproducts in the summed signals provided to the base station. Applying the transfer function to received signals can include, for example, filtering the received signal with the filtering characteristics specified by the transfer function. The transfer function can be applied, for example, prior to summing the received signals from each remote unit (as shown in FIGS. 3-6).

Figure 7:
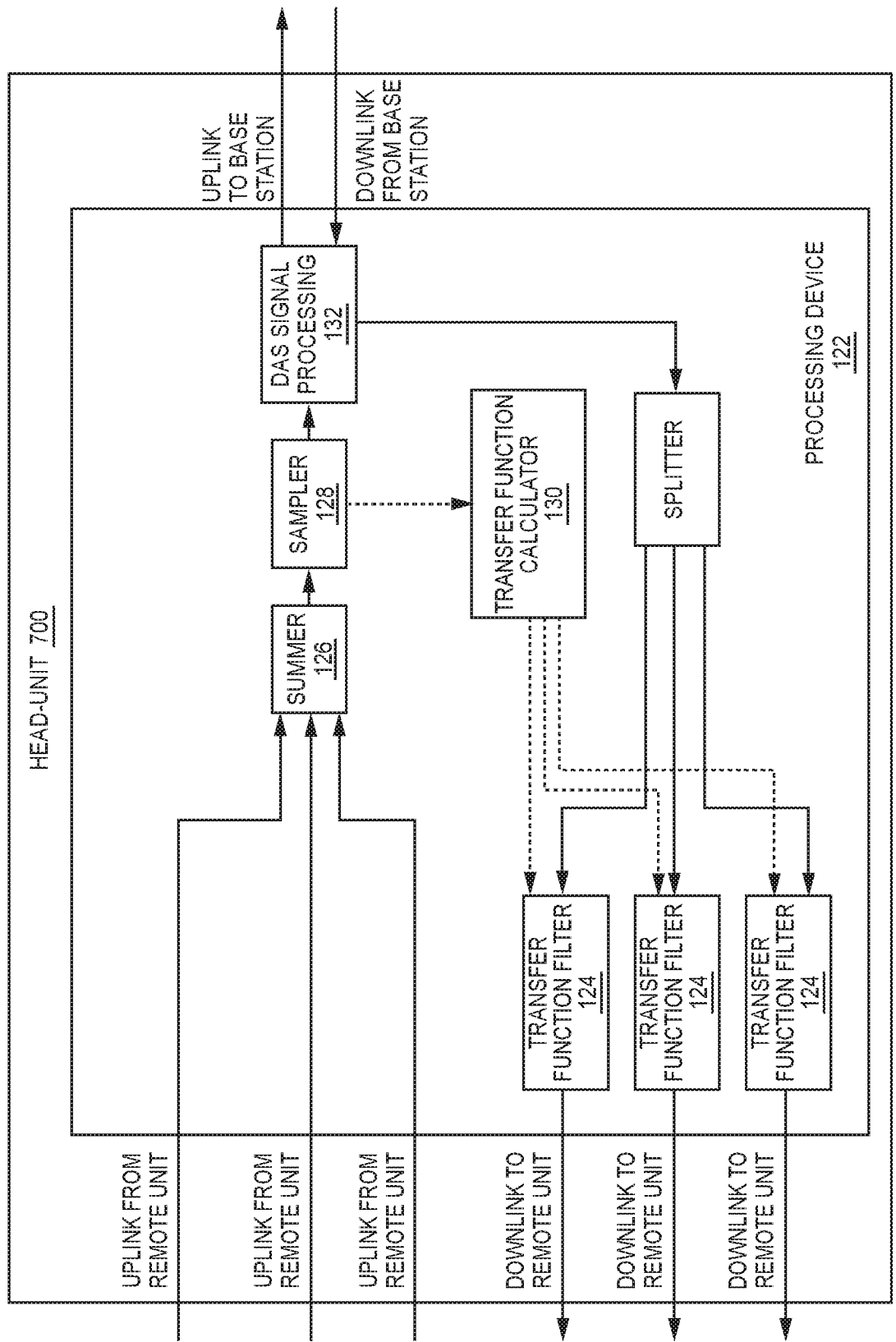

In other aspects, the head-end unit can apply the transfer function to each of the transmit signals being provided from the head-end unit to each remote unit (shown in FIG. 7).

The transfer function can be applied to either the receive signals or transmit signals in pairs, in small groups, or to all transmit signals or all receive signals simultaneously.

Other methods to calculate the transfer function are possible. For example, the test reference signal can be a pre-determined reference signal based on previously stored intermodulation byproduct models. The DAS system operator can configure the DAS with the pre-determined reference signal.

In another example, a remote unit can generate a pilot signal at the edge of the transmit band to allow the head-end unit to determine the transfer function (at least in part due to antenna isolation variance). In this case, the transfer function can be updated during the normal operation of the DAS.

In another method, the undesired intermodulation byproducts can be reduced without the use of a test reference signal. For example, the transfer function can be determined by applying signal processing techniques to minimize the interference signal in the uplink received signal. In one aspect, the head-end unit can minimize like signals in the desired uplink band, as the desired signals may be different/non-correlated at each remote unit, while the undesired transmit intermodulation can be the same at each receiver. For example, if transmit signals from non-adjacent remote units are summed together, the desired signals from each remote unit can be non-correlated while the undesired intermodulation byproducts may be similar and cancelable.

In another aspect, the desired signals from multiple remote units may be common or otherwise correlated (e.g., if two adjacent remote units receive uplink signals from a single mobile device). In this aspect, the head-end unit may determine, for example, in which locations in the band the undesired signals may fall (from the original transmit signals) and determine the cancellation by minimizing signal/noise in the bandwidth that has the undesired signals.

Figure 3:
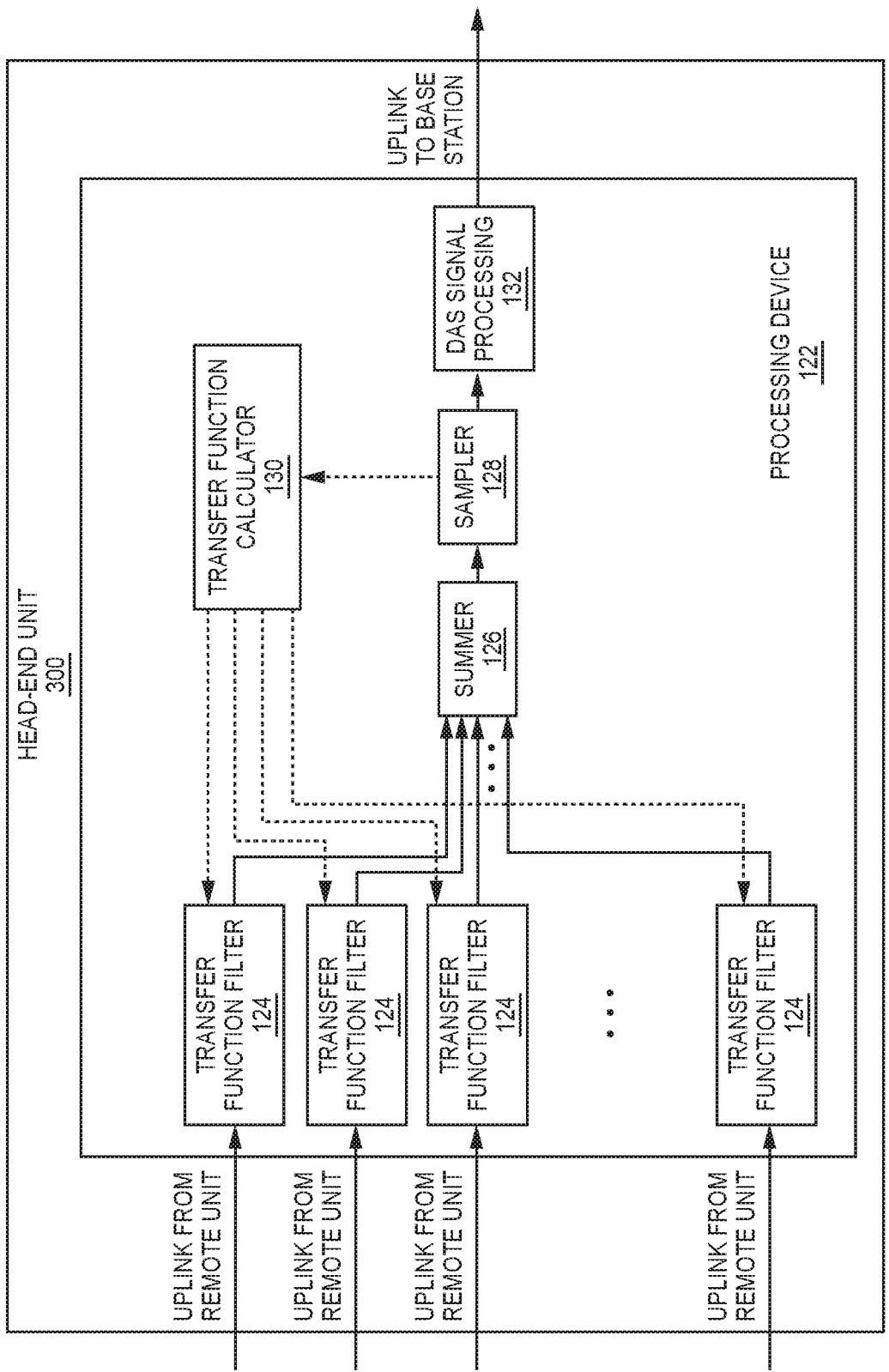
FIGS. 3-8 show various examples of how nodes in a distributed antenna system can be configured for cancelling, reducing, attenuate, or eliminating unwanted intermodulation byproducts.

As shown in FIG. 3, the head-end unit 300 can include multiple transfer function filters 124, each transfer function filter 124 receiving uplink signals from a different respective remote unit. The received signals can be provided to a summer 126 included in the head-end unit 300. A sampler 128 in the head-end unit 300 can then sample the summed signals, generating sampled signals provided to a transfer function calculator 130. The transfer function calculator 130 can determine the transfer functions for each transfer function filter 124. During subsequent received signals, each transfer function filter 124 can apply the transfer function calculated by the transfer function calculator 130, cancelling, reducing, attenuating, or eliminating the unwanted intermodulation byproducts before the uplink signals are summed by the summer 126.

Figure 4:
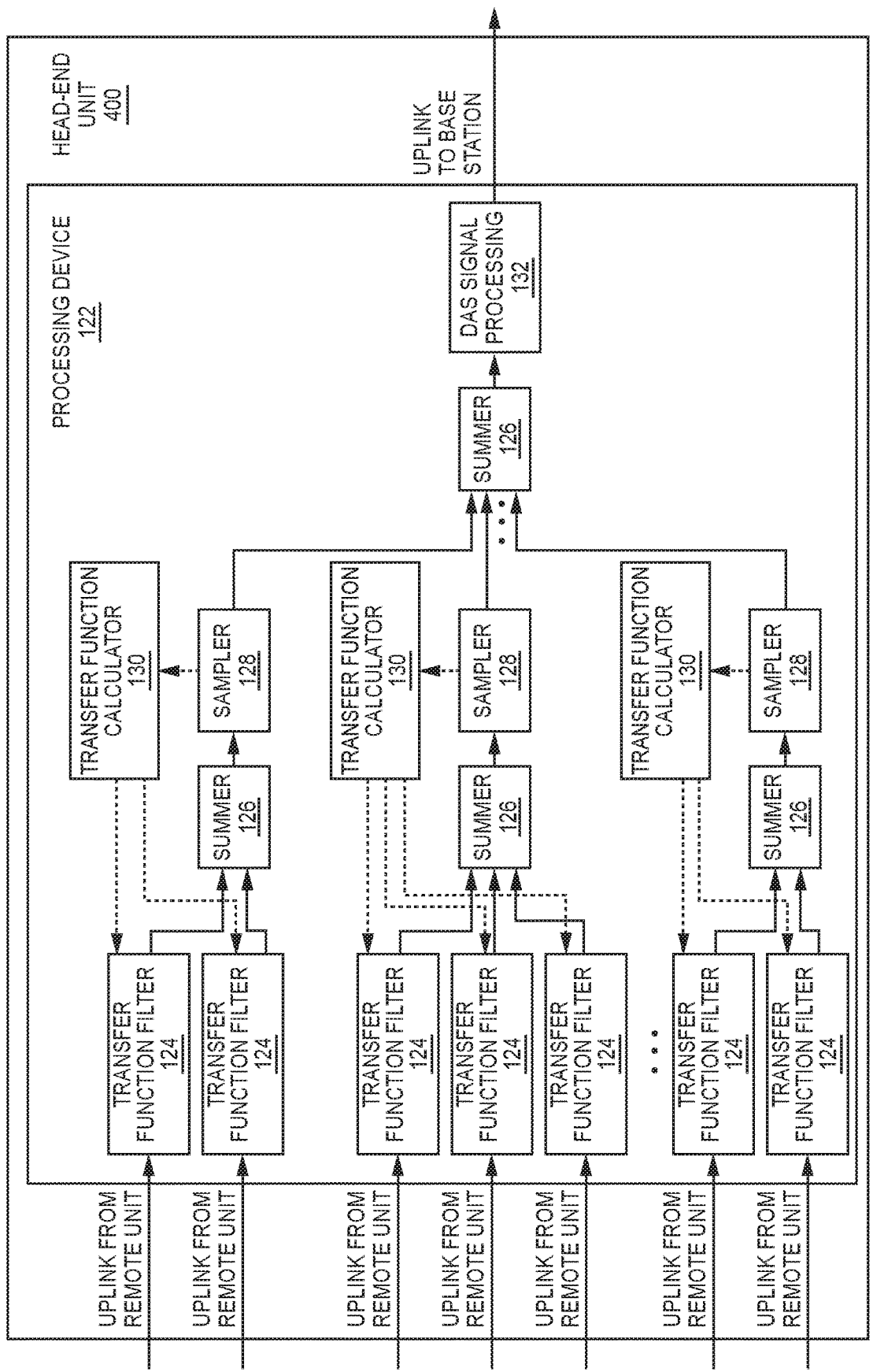
Figure 5:
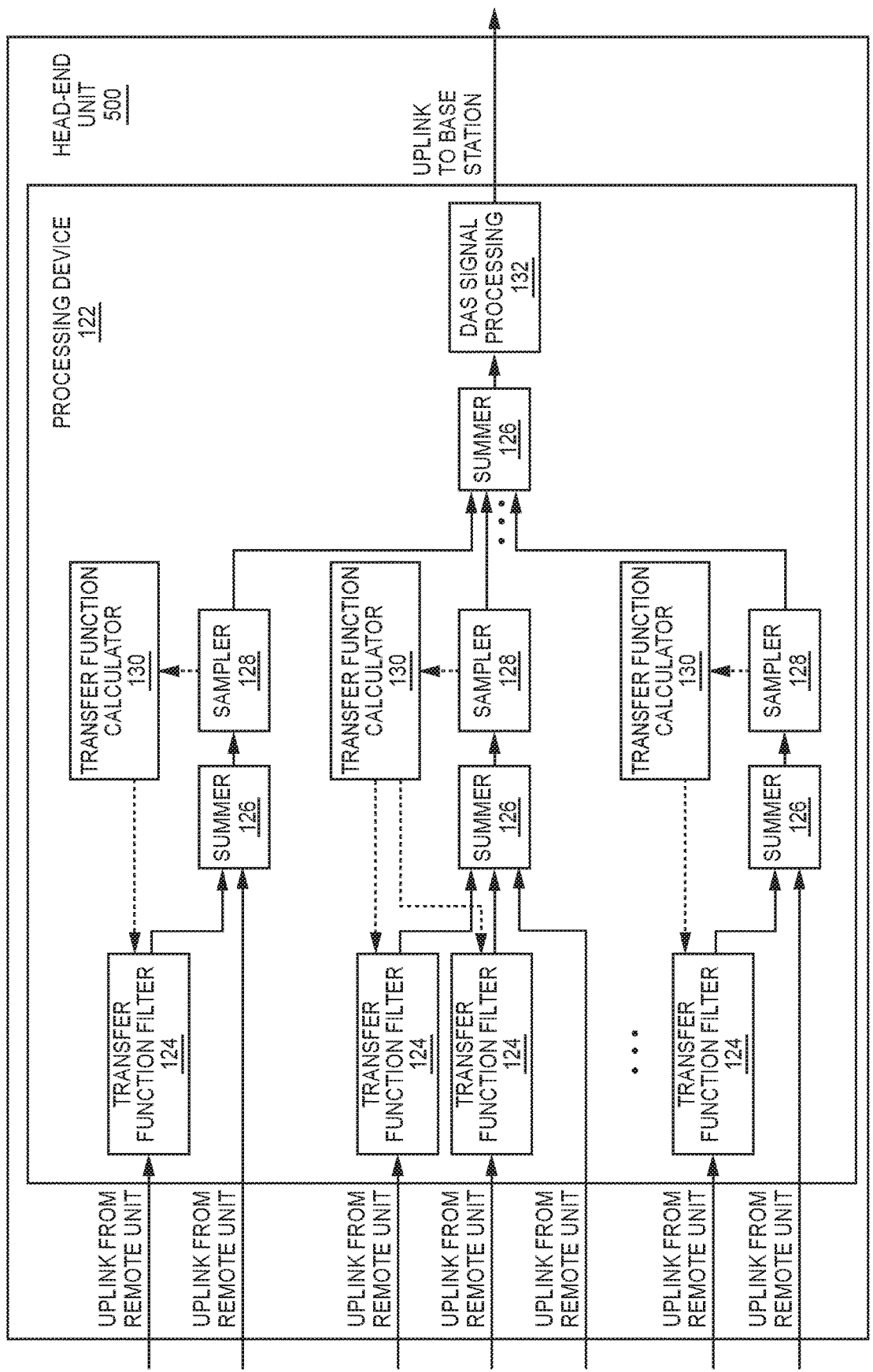
Figure 6:
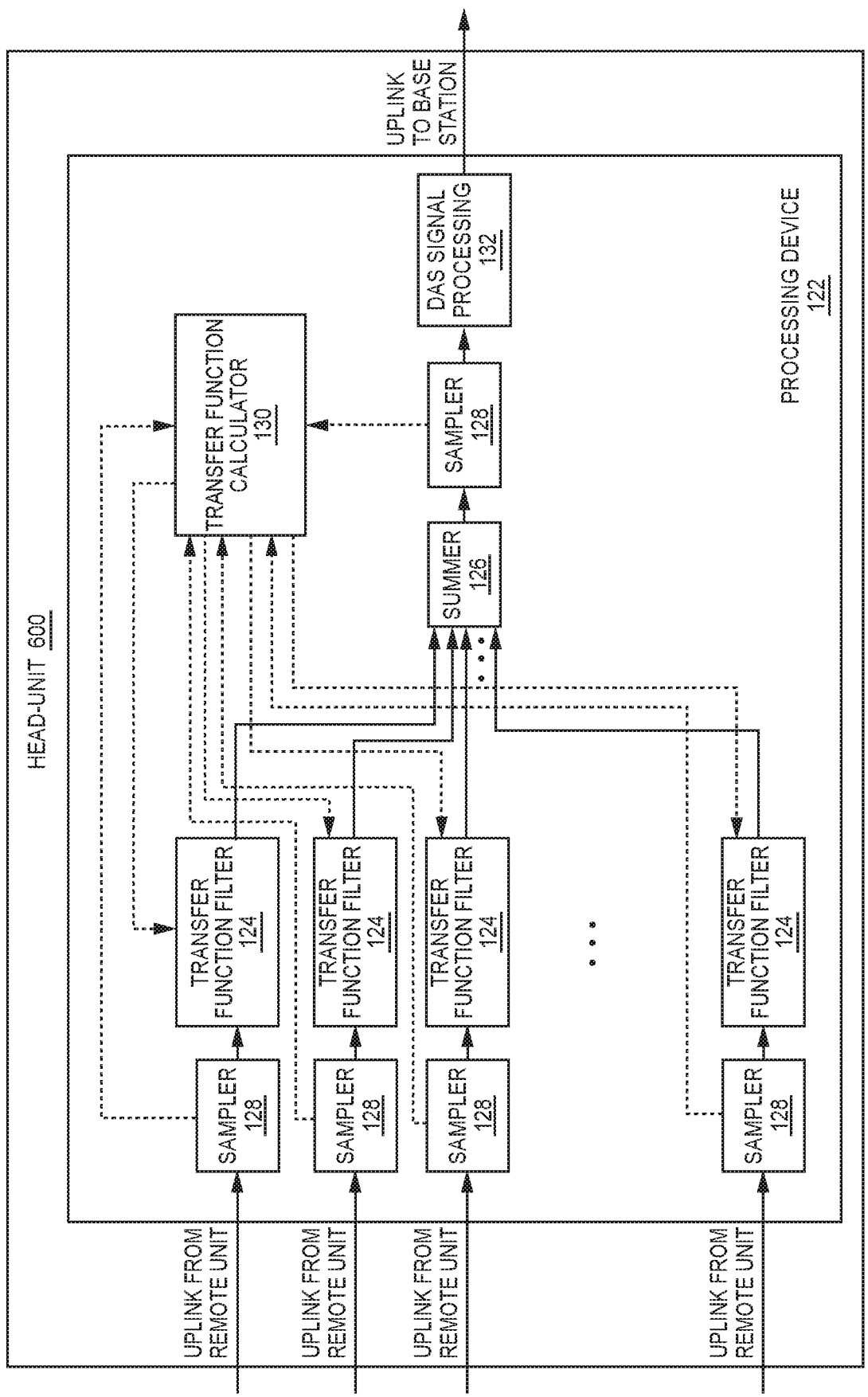

FIGS. 4-6 depict additional configurations for a head-end unit for cancelling, reducing, attenuating, or eliminating unwanted intermodulation byproducts according to certain aspects. FIG. 4 depicts a head-end unit 400 configured such that summation and cancellation, reduction, attenuation, or elimination of the unwanted intermodulation byproducts can be performed in small groups of remote unit inputs (e.g., two or three per group). The minimized signals can then be summed together at a summer 126 before being provided to a DAS signal processing block 132. The DAS signal processing block 132 can then perform standard digital DAS processing on the downlink and uplink IQ data (for example, as described above).

In other examples, the transfer function may be applied to n−1 of the total number n of received signals being summed, since the cancellation occurs between/amongst the summed signals. FIG. 5 depicts a block diagram of a head-end unit 500 calculating and applying a transfer function to n−1 of the total number of received signals being summed. The head-end unit 500 can include multiple transfer function filter 124, each transfer function filter 124 receiving uplink signals from a different respective remote unit. The received signals can be provided to a summer 126 included in the head-end unit 500. A sampler 128 in the head-end unit 500 can then sample the summed signals, generating sampled signals provided to a transfer function calculator 130. The transfer function calculator 130 can determine the transfer functions for each transfer function filter 124. During subsequent received signals, each transfer function filter 124 can apply the transfer function calculated by the transfer function calculator 130, cancelling, reducing, attenuating, or eliminating the unwanted intermodulation byproducts before the uplink signals are summed by the summer 126.

FIG. 6 depicts a head-end unit 600 configured such that each received signal from the respective remote units is provided to a respective sampler 128. The samples of the individual received signals can be provided to the transfer function calculator 130. The transfer function calculator 130 can extract the reference signals communicated in each received signal (by processing the associated digital IQ data) in order to determine the individual transfer functions/non-linear models of the receive isolation path through the remote units. The transfer function calculator 130 provides the calculated transfer functions to the respective transfer function filters 124, which can apply the transfer functions to the received uplink signals from each remote unit. Undesired intermodulation byproducts can be canceled, reduced, attenuated, or eliminated as they are being summed by the summer 126.

As noted above, in other aspects, the head-end unit can apply the transfer function to each of the transmit signals being provided from the head-end unit to each remote unit. FIG. 7 depicts one example of a head-end unit 700 configured so that a downlink signal provided to each remote unit is filtered by a transfer function filter 124. The transfer function calculator 130 calculates the transfer functions that are applied to the transfer functions 124 based on samples made by samplers 128 in the uplink signal path.

Figure 8:
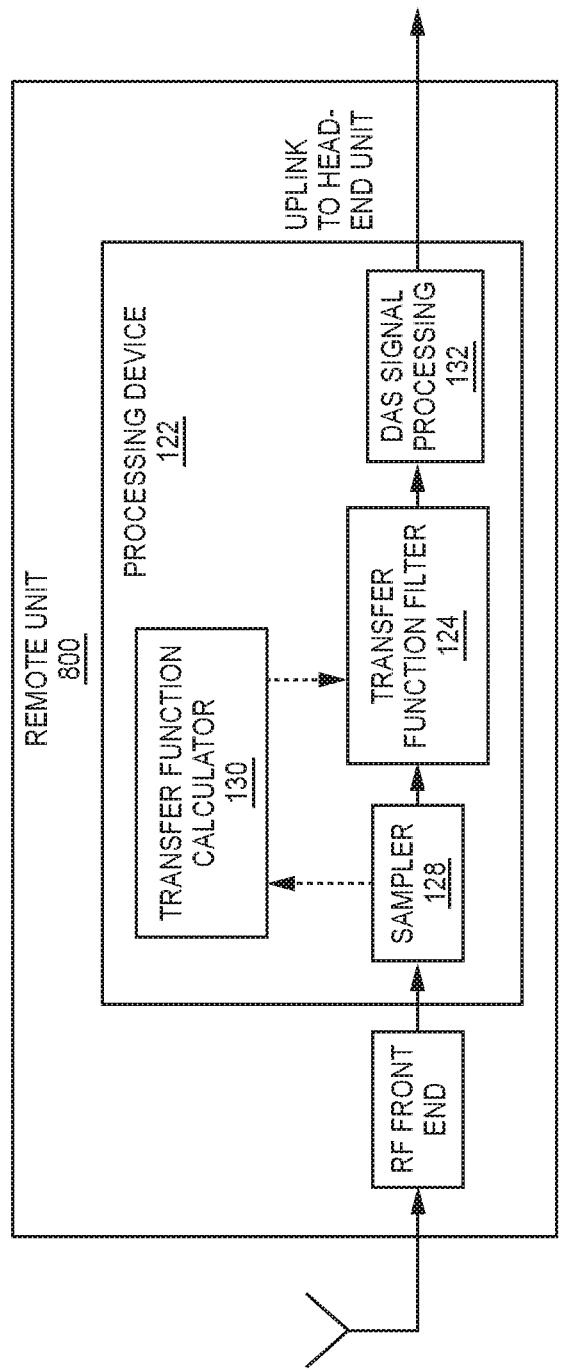

These techniques can be used in other DAS nodes. For example, as shown in FIG. 8, a remote unit 800 includes a processing device 122 that can be configured such that each received signal transmitted from that remote unit to the head-end unit (either directly or via an expansion unit or other intermediary unit) is first sampled by a sampler 128. The samples of the received signal can be provided to a transfer function calculator 130 in the remote node 800. The transfer function calculator 130 can extract the reference signals communicated in each received signal (by processing the associated digital IQ data) in order to determine the transfer function/non-linear model of the receive isolation path through the remote unit. The transfer function calculator 130 provides the calculated transfer function to a transfer function filter 124, which can apply the transfer function to the received uplink signal, thereby cancelling, reducing, attenuating, or eliminating the undesired intermodulation byproducts before the uplink signal is transmitted from the remote unit to the head-end unit.

The techniques described here can also be applied in other nodes or parts of a DAS (for example, in expansion units or other intermediary units).

The techniques described above can also be used in a DAS that makes use of analog transport or combinations of analog and digital transport. In one example of a DAS that uses analog transport, a node can be configured to digitize the analog signals to produce digital IQ data from the analog signals (for example, in the manner described above). The resulting digital IQ data then be used to calculate and apply a transfer function (using, for example, digital signal processing techniques similar to the ones described above) in order to cancel, reduce, attenuate, or eliminate undesired intermodulation byproducts. The resulting processed digital IQ data can then be used to produce suitable analog signals, which can then be transported as in conventional analog DAS systems.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Example Embodiments

Example 1 includes a distributed antenna system (DAS) comprising: a plurality of nodes, including: a head-end unit; and a plurality of remote units that are communicatively coupled to the head-end unit; wherein the head-end unit is configured to receive uplink received signals from remote units that wirelessly transceiver signals in a coverage area; wherein the head-end unit is configured to sum two or more of the uplink received signals to produce a summed uplink received signal; and wherein at least one of the nodes of the DAS includes a processing device configured to determine a transfer function and apply the transfer function to signals in the DAS to cancel, reduce, attenuate, or eliminate intermodulation byproducts in the summed uplink received signal.

Example 2 includes the DAS of Example 1, wherein the processing device is configured to determine the transfer function by comparing a test reference signal transmitted by a remote unit to a receive feedback signal to determine inverse signal characteristics of unwanted intermodulation byproducts in the receive feedback signal.

Example 3 includes the DAS of Example 2, wherein the inverse signal characteristics include a phase shift and an amplitude shift.

Example 4 includes any of the DASs of Examples 1-3, wherein the transfer function is determined by minimizing the uplink received signal after the uplink received signals are summed to produce the summed uplink received signal.

Example 5 includes any of the DASs of Examples 1-4, wherein the transfer function is determined by minimizing the uplink received signals in a specific portion of an uplink band determined to have intermodulation noise from analysis of the downlink transmitted signals.

Example 6 includes any of the DASs of Examples 1-5, wherein the transfer function is applied to the uplink received signals prior to summation.

Example 7 includes any of the DASs of Examples 1-6, wherein the transfer function is applied to one or more of the uplink received signals in the head-end unit.

Example 8 includes any of the DASs of Examples 1-7, wherein the transfer function is applied to one or more of the signals in at least one of the remote units.

Example 9 includes any of the DASs of Examples 1-8, wherein the transfer function is applied to one or more of the signals in an expansion unit used to communicatively couple at least one remote unit to the head-end unit.

Example 10 includes any of the DASs of Examples 1-9, wherein the transfer function is applied in at least one node of the DAS to at least one transmit signal communicated over the DAS.

Example 11 includes a method performed in a distributed antenna system (DAS) comprising a plurality of nodes, including a head-end unit communicatively coupled to a plurality of remote units, the method comprising: transmitting a test reference signal from the remote unit; receiving a feedback signal from the test reference signal at a receive antenna of the remote unit; calculating, from the test reference signal and the feedback signal, a transfer function to cancel, reduce, attenuate, or eliminate intermodulation byproducts in subsequent signals received by the head-end unit; and applying the transfer function to signals of the DAS in order to cancel, reduce, attenuate, or eliminate intermodulation byproducts.

Example 12 includes the method of Example 11, further comprising providing the test reference signal and the feedback signal to the head-end unit for use in calculating the transfer function to cancel, reduce, attenuate, or eliminate intermodulation byproducts in subsequent signals received by the head-end unit.

Example 13 includes any of the methods of Examples 11-12, wherein calculating, from the test reference signal and the feedback signal, the transfer function to cancel, reduce, attenuate, or eliminate intermodulation byproducts in subsequent signals received by the head-end unit comprises: comparing the test reference signal to the receive feedback signal to determine inverse signal characteristics of unwanted intermodulation byproducts in the feedback signal.

Example 14 includes the method of Example 13, wherein the inverse signal characteristics include a phase shift and an amplitude shift.

Example 15 includes any of the methods of Examples 11-14, wherein the transfer function is calculated by minimizing the uplink received signal after two or more uplink received signals are summed to produce a summed uplink received signal.

Example 16 includes any of the methods of Examples 11-15, wherein calculating, from the test reference signal and the feedback signal, the transfer function to cancel, reduce, attenuate, or eliminate intermodulation byproducts in subsequent signals received by the head-end unit comprises: minimizing uplink received signals in a specific portion of an uplink band determined to have intermodulation noise from analysis of the downlink transmitted signals.

Example 17 includes any of the methods of Examples 11-16, wherein the transfer function is applied to two or more uplink received signals prior to summation.

Example 18 includes any of the methods of Examples 11-17, wherein the transfer function is applied to one or more of uplink received signals in the head-end unit.

Example 19 includes any of the methods of Examples 11-18, wherein the transfer function is applied to one or more of signals in at least one of the remote units.

Example 20 includes any of the methods of Examples 11-19, wherein the transfer function is applied to one or more signals in an expansion unit used to communicatively couple at least one remote unit to the head-end unit.

Example 21 includes any of the methods of Examples 11-20, wherein the transfer function is applied in at least one node of the DAS to at least one transmit signal communicated over the DAS.

What is claimed is:

1. A device, comprising:
   one or more processing devices comprising an input and an output, the one or more processing devices configured to:
   receive an input signal via the input of the one or more processing devices;
   apply a transfer function of a variable filter implemented via the one or more processing devices, the transfer function applied to the received input signal in order to generate a filtered signal, wherein application of the transfer function cancels, reduces, attenuates, or eliminates intermodulation byproducts of the input signal; and output the filtered signal via the output of the one or more processing devices.

2. The device of claim 1, wherein the one or more processing devices are configured so that the transfer function comprises inverse signal characteristics of unwanted intermodulation byproducts in the input signal.

3. The device of claim 2, wherein the inverse signal characteristics include a phase shift and an amplitude shift.

4. The device of claim 1, wherein the one or more processing devices are configured to implement a transfer function calculator configured to determine the transfer function based on one or more captured samples of the input signal or the filtered signal, wherein the transfer function calculator is configured to provide the determined transfer function to the variable filter to configure the variable filter.

5. The device of claim 1, wherein the transfer function calculator is configured to determine the transfer function by minimizing uplink received signals after the uplink received signals are summed to produce a summed uplink received signal.

6. The device of claim 1, wherein the device comprises a head-end unit of a distributed antenna system.

7. The device of claim 6, wherein the variable filter is positioned in the uplink path of the head-end unit, wherein the input signal comprises an uplink received signal, wherein the variable filter is configured to apply the transfer function to the uplink received signal prior to summation of the input signal with other signals in the head-end unit.

8. The device of claim 6, wherein the variable filter is positioned in the uplink path of the head-end unit, wherein the input signal comprises an uplink received signal, wherein the variable filter is configured to apply the transfer function to the uplink received signal after summation of the input signal with other signals in the head-end unit.

9. The device of claim 6, wherein the variable filter is positioned in the downlink path of the head-end unit, wherein the input signal comprises a downlink signal received from a base station, wherein the variable filter is configured to apply the transfer function to the downlink signal in the head-end unit.

10. The device of claim 1, wherein the device comprises a remote unit of a distributed antenna system.

11. The device of claim 1, wherein the device comprises an expansion unit of a distributed antenna system, wherein the expansion unit is used to communicatively couple at least one remote unit to a head-end unit.

12. A device, comprising:
a processing device comprising a plurality of inputs and one or more outputs, wherein the processing device is configured to:
receive a respective input signal via each of the plurality of inputs of the processing device;
apply a respective transfer function of a respective variable filter of a plurality of variable filters implemented via the processing device, each respective transfer function applied to a respective received input signal in order to generate a respective filtered signal, wherein application of the respective transfer function cancels, reduces, attenuates, or eliminates intermodulation byproducts; and
output the respective filtered signals via the one or more outputs of the processing device.

13. The device of claim 12, wherein the processing device is further configured to implement one or more summers, wherein the one or more summers are configured to sum two or more of the respective filtered signals output by the respective variable filters.

14. The device of claim 12, wherein the device comprises a head-end unit of a distributed antenna system.

15. The device of claim 12, wherein the processing device is configured so that the respective transfer functions comprise inverse signal characteristics of unwanted intermodulation byproducts in the respective input signal.

16. The device of claim 15, wherein the inverse signal characteristics include a phase shift and an amplitude shift.

17. The device of claim 12, wherein the processing device is configured to implement one or more transfer function calculators configured to determine the respective transfer functions based on one or more captured samples of the respective input signals or the respective filtered signals, wherein the one or more transfer function calculators are configured to provide the determined respective transfer functions to the respective variable filters to configure the respective variable filters.

18. A device, comprising:
a processing device having an input and an output, wherein the processing device is configured to:
determine a transfer function based on one or more captured samples of a signal;
apply the determined transfer function with a variable filter implemented via the processing device, the determined transfer function applied to an input signal received at the input of the processing device in order to generate a filtered signal, wherein application of the transfer function cancels, reduces, attenuates, or eliminates intermodulation byproducts of the input signal; and
output the filtered signal via the output of the processing device.

19. The device of claim 18, wherein the processing device is configured so that the transfer function comprises inverse signal characteristics of unwanted intermodulation byproducts in the input signal.

20. The device of claim 19, wherein the inverse signal characteristics include a phase shift and an amplitude shift.

* * * * *